July 23, 1929.  J. W. SULLENGER  1,721,606
FRONT WHEEL CONSTRUCTION
Filed March 4, 1927
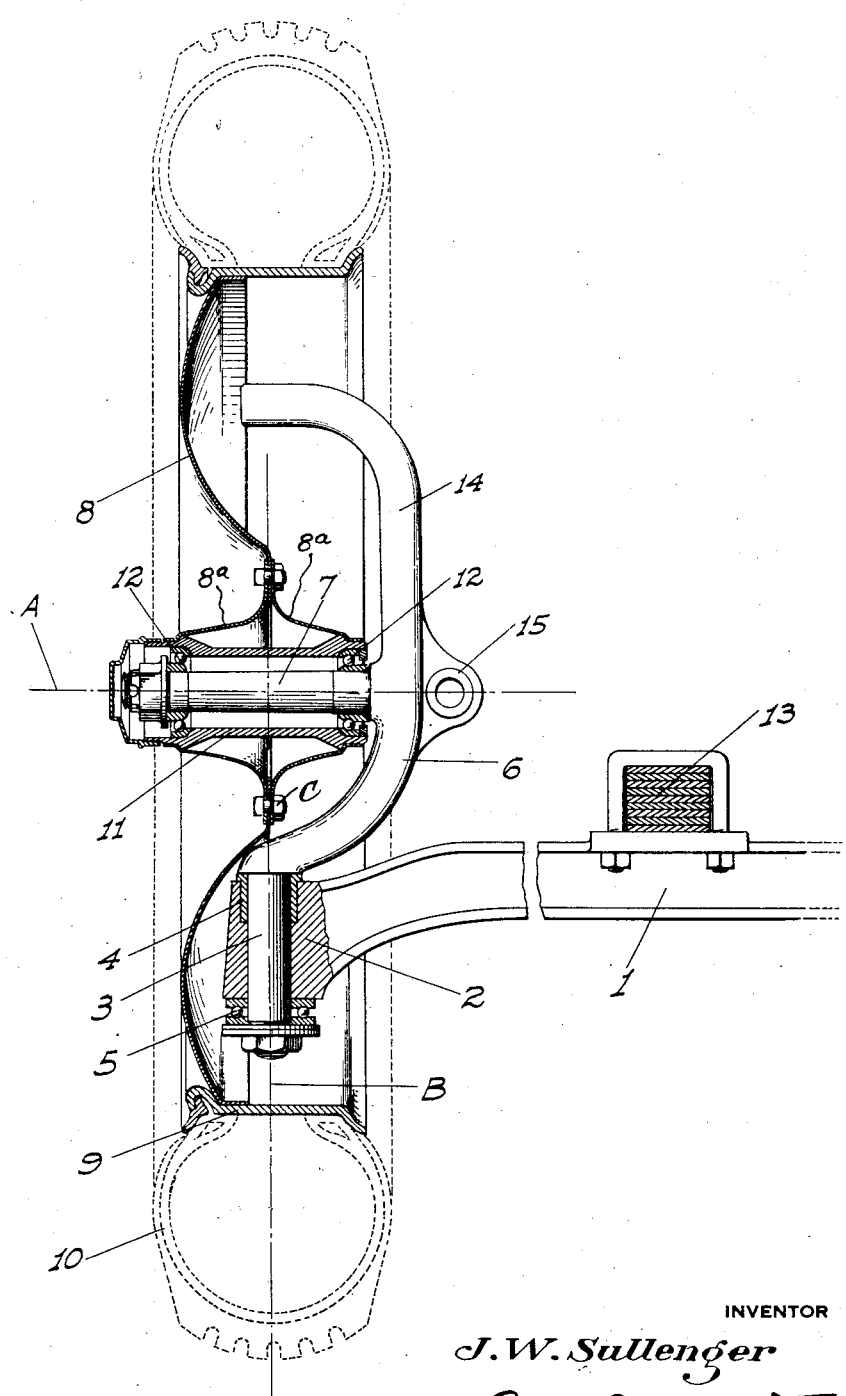
INVENTOR
J. W. Sullenger
BY
ATTORNEY Patented July 23, 1929.

1,721,606

UNITED STATES PATENT OFFICE.

JOE W. SULLENGER, OF FRESNO, CALIFORNIA.

FRONT-WHEEL CONSTRUCTION.

Application filed March 4, 1927. Serial No. 172,730.

This invention relates to improvements in front wheel construction for motor vehicles. It is recognized as one of the requirements for ideal steering conditions that the front wheels should be disposed so that when turned to the right or left with the car stationary, the contact points between the ground and the wheels will remain fixed or at the same points. In other words such contact points must be then vertically alined with the axes of the knuckle pins. To approximate such conditions the wheel spindles have heretofore been given a downward tilt, so as to likewise tilt or cant the wheels to such an extent as to move the bottoms of the wheels inwardly so that their transverse center line will be substantially in vertical alinement with the knuckle pins. The wheels, however, are seldom if ever tilted to the full extent necessary to actually obtain the above ideal relation, since the strains on the wheels become very great when they are thus tilted to any great extent, and the appearance of the car is impaired if the wheels have too much slant.

Also all wheel spindles now project outwardly from the knuckle pins so that the wheels are of course supported to one side of the pins. This, as will be evident, puts a continuous and severe lateral strain on the pins on opposite sides thereof at top and bottom. This results in rapid and uneven wear of the knuckle pin bearings or bushings and, apart from necessitating frequent repairs or replacements, makes for hard steering.

Also, owing to the placing of the wheel spindles outwardly of the knuckle pins, the driving strains from the chassis are imparted to the front wheels, in an out-of-line or offset manner, placing a severe strain on the spindles and adjacent connected parts which tends to crystallize them. This arrangement of the spindles relative to the knuckle pins also causes a constant tendency of the wheels to turn about the pins to be imparted thereto, which must be counteracted by the usual tie rod arrangement and absorbed by the steering gear.

The principal object of my invention therefore is to provide a front wheel mounting construction so arranged that the danger factor had with the usual construction is eliminated, the wheels tend to run straight at all times, and all strains are taken off the spindles, tie rods and steering gear.

Another major object of my invention is to provide a wheel and supporting structure constructed and arranged together in such a manner that the knuckle pin of a wheel will be directly over the point of contact of the wheel with the ground, while maintaining the wheel perfectly straight. In this manner ideal steering conditions in this respect are obtained without the need of canting the wheel, thereby eliminating the strains on the wheel caused by such canting, and also eliminating the need of the excessive steering gear ratio as usual in connection with balloon tires, to facilitate steering with the ordinary construction.

Another important object of the invention is to arrange the points of bearing between the wheel spindle and the wheel hub at such positions relative to the knuckle pin that the latter is freed from all uneven lateral strains and only has to withstand a positive vertical or longitudinal pressure. By means of my improved structure therefore not only is steering greatly facilitated but strains and wear on the knuckle pins and wheels are reduced to a minimum.

A further object of the invention is to provide an axle and spindle structure so disposed that the main supporting springs are so located that the usual uneven strains on the knuckle pin had when the car is started, will be minimized and greatly neutralized.

A still further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

The figure on the drawing is a vertical section of my improved wheel and supporting structure.

Referring now more particularly to the characters of reference on the drawings, the numeral 1 denotes the front axle which is bent down at each end to form a supporting knuckle 2 for the knuckle pin 3. At its upper end the pin is engaged by a bearing such as a bushing 4 or the like, mounted in the knuckle and at its lower end a thrust bearing 5 is disposed between the pin and knuckle. Projecting upwardly and inwardly or laterally from the pin is an arm 6 from the upper end of which a truly horizontal spindle 7 projects outwardly and across the plane of the pin, the axis A of the spindle intersecting the axial line B of the knuckle pin.

The wheel which is mounted on this supporting structure is of the disc type and comprises a main disc or web portion 8, shaped transversely to clear the knuckle and arm and is provided with a rim structure 9 of suitable character to support a tire 10. The rim is so located on the wheel that its transverse center and also that of the tire will be located directly on the axial line B. The wheel is provided with a hub 11 having a pair of longitudinally spaced bearings 12 therein of suitable character which engage the spindle and are disposed equal distances on each side of the axial line B of the knuckle pin in a plane transversely of the wheel. The main web 8 of the wheel terminates at its inner periphery in the space between the knuckle pin and the hub and in direct transverse alinement with the axis of the knuckle pin. From such termination, branch webs 8ª extend laterally to engage the hub at points equidistant from said transverse axis, and preferably adjacent the bearings 12. Bolts C detachable connect the webs 8 and 8ª, so that the wheel may be removed without disturbing the hub.

By reason of this construction, it will be evident that the load is supported by the spindle equally at both ends, and there is therefore no tendency for the spindle to be tilted vertically, and the knuckle pin laterally. This is radically different from the ordinary practice of attaching the wheel-web to one end or the other of the hub only, and which, in connection with the usual unevenly offset spindles, results in severe and uneven wear on the bearings, and a tendency to crystallization. This improved construction also eliminates any tendency for the wheels to sway or shimmy laterally when striking an obstruction—a tendency which in ordinary construction must be taken by the steering gear, and is of course hard both on the gear and on the driver.

By means of this arrangement it will be seen that the center of turning of the wheel is directly in line with the point of contact of the tire with the ground without canting the wheel. It will also be seen that owing to the location of the spindle and the wheel bearings relative to the knuckle pin, all lateral supporting strains on the latter are eliminated and the pressure and load is taken in a vertical direction by the thrust bearing instead of by the sides of the pin.

The usual type of leaf springs indicated at 13 are mounted on the axle, the latter being of such form that the horizontal plane of the springs is intermediate the horizontal planes of the spindle and knuckle pin. The connection of the axle with the knuckle pin being below the spring connection with the axle, and the connection of the spindle with the wheel being above such spring connection, opposed crank arms are thus formed which in operation act in connection with my improved wheel mounting arrangement to promote ease of riding and handling, takes the strains now transmitted to the steering gear, and lessens the strains and shocks generally.

If it is intended to incorporate this structure in a wheel provided with brakes, the arm 6 would have an extension 14 projecting above the spindle a certain distance, and then inwardly of the wheel and across the vertical axial line B, to form a support for the brake shoes.

In order to connect the knuckle pin unit to a steering or tie rod arm, an orificed lug 15, also serving as a strengthening rib, projects from the inner face of the arm 6, preferably in horizontal alinement with the spindle.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

In a vehicle wheel assembly an axle, a wheel having a hub, and a knuckle connecting the wheel and axle, said knuckle having, at its lower end, a portion forming a knuckle-pin, said pin being mounted in the axle, said knuckle being inwardly offset above the said pin, and bearing above the offset a horizontal spindle upon which the wheel hub is mounted, said offset being inwardly disposed to an extent sufficient to bring the central plane of the wheel and the central portion of the hub into alignment with the axis of the said knuckle pin.

In testimony whereof I affix my signature.

JOE W. SULLENGER.